United States Patent
Grosman et al.

(10) Patent No.: US 12,038,901 B2
(45) Date of Patent: Jul. 16, 2024

(54) METHOD AND SYSTEM FOR NON-BLOCKING DATABASE LOGGING BATCHING

(71) Applicants: Ronen Grosman, Markham (CA); Ping Chen, Markham (CA)

(72) Inventors: Ronen Grosman, Markham (CA); Ping Chen, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 101 days.

(21) Appl. No.: 17/666,291

(22) Filed: Feb. 7, 2022

(65) Prior Publication Data

US 2022/0269667 A1 Aug. 25, 2022

Related U.S. Application Data (60) Provisional application No. 63/153,146, filed on Feb. 24, 2021.

(51) Int. Cl.
*G06F 7/00* (2006.01)
*G06F 16/00* (2019.01)
*G06F 16/23* (2019.01)

(52) U.S. Cl.
CPC ................ *G06F 16/2358* (2019.01)

(58) Field of Classification Search
None
See application file for complete search history.

(56) References Cited

U.S. PATENT DOCUMENTS

| | | | | |
|---|---|---|---|---|
| 6,732,124 B1 * | 5/2004 | Koseki | ............... | G06F 12/0868 711/119 |
| 2009/0113443 A1 * | 4/2009 | Heller, Jr. | ............ | G06F 9/3004 718/106 |
| 2015/0189034 A1 * | 7/2015 | Kelkar | .................... | H04L 67/01 709/203 |
| 2019/0325055 A1 * | 10/2019 | Lee | ..................... | G06F 16/1734 |
| 2021/0374037 A1 * | 12/2021 | Grimwood | ......... | G06F 16/1734 |

FOREIGN PATENT DOCUMENTS

CN 112306699 A 2/2021

\* cited by examiner

*Primary Examiner* — Tuan A Pham (57) ABSTRACT

Methods and system for a database management system (DBMS) in which a leader thread is elected from concurrent transaction threads stored in one or more data nodes. While the leader thread copies its own thread transaction log onto a reserved portion of the shared log buffer, the leader thread permits other transaction threads to attach to a thread chain starting with the leader thread. Once the leader has completed copying its thread transaction log onto the shared log buffer, it then reserves a portion of the shared log buffer, and copies the member thread transaction logs onto the shared log buffer to reduce the contention for shared buffer may be reduced.

24 Claims, 5 Drawing Sheets

METHOD AND SYSTEM FOR NON-BLOCKING DATABASE LOGGING BATCHING

RELATED APPLICATION DATA

The present application claims priority to, and the benefit of, provisional U.S. patent application No. 63/153,146, filed Feb. 24, 2021, the content of which is incorporated herein by reference.

TECHNICAL FIELD

The present application relates to database management, in particular to methods and system for batching logging transactions within an information processing environment such as a database in a non-blocking manner.

BACKGROUND

Database transaction log (also referred to as redo logs) is a fundamental component of any relational database management system (RDBMS). The transaction logs keep a historical record of all database actions executed by a database management system to ensure atomicity, consistency, isolation, durability (ACID) properties to guarantee data validity and prevent data loss despite database server errors and failures. Each transaction log contains a group of transaction records (also referred to as redo records), each of which comprises one or more change vectors that are representative of one or more respective changes made to a block of data in the database.

A database server system can simultaneously process many transaction requests from clients. The client requests are sent to the database server through database connections, for each of which a thread in the database server is invoked to process the particular transaction request. The individual transaction logs of each database server thread, referred to as a transaction thread, are buffered in shared log buffer prior to being persisted in log files on disks. The access to the shared log buffer involves thread synchronization, which all database systems endeavor to optimize in order to improve database parallelism and avoid scalability issues.

Solutions in dealing with thread synchronization can be generally categorized into two types based on whether locking is used to regulate the shared log buffer access. Absent the restriction posed by the number of locks on the number of threads that may reserve buffer space, the lock-free type of systems permit different transaction threads to concurrently copy their generated logs onto the shared log buffer without overlapping. However, this implementation introduces other performance issues that may be exacerbated in larger servers, such as high-core-multi-NUMA systems. Specifically, in larger servers, the lock-free logging performance degrades due to the contention of the shared log buffer space reservation, which is worsened when the number of transaction threads attempting to reserve memory space is increased.

Accordingly, it is desirable to provide an improved lockless RDBMS that alleviates the shared log buffer contention issue.

SUMMARY

The present disclosure provides methods and systems for a database management system (DBMS) with a lockless transaction log synchronization in which transaction threads generate respective thread transaction logs. The transaction threads may be organized into one or more data nodes, such as Non-Uniform Memory Access (NUMA) nodes. Each node comprises one or more processing units (or processors) and memory. In at least partially addressing the shortcomings of the prior art, a leader thread is elected from concurrent transaction threads in each NUMA node. The leader thread reserves a portion of the shared log buffer for copying its own thread transaction log. When the reservation request is processed, the leader thread copies its thread transaction log onto the reserved portion of the shared log buffer. While the leader is processing its thread transaction log, the leader thread permits other transaction threads to attach to a thread chain starting with the leader thread. Once the leader has completed copying its thread transaction log onto the shared log buffer, it ends any further thread attachments to the thread chain. The leader thread then reserves a portion of the shared log buffer required to accommodate the thread transaction logs of all member threads in the thread chain, and copies the member thread transaction logs onto the shared log buffer. The contents of the shared log buffer may then be transferred onto the shared transaction log in a disc or any suitable non-transitory permanent data storage unit(s). By having a single thread, namely the leader thread, to reserve and copy over the transaction logs of multiple concurrent member threads, the contention for shared buffer may be reduced.

In accordance with a first aspect of the present disclosure, there is provided a method for storing transaction records that describe changes occurring in a database to a transaction log shared by multiple transaction threads in a manner that reduces contention among the multiple transaction threads, wherein the multiple transaction threads are stored in one or more data nodes. A leader thread is elected from the multiple transaction threads. A first portion of a shared log buffer for storing transaction records of the leader thread is reserved. The transaction records of the leader thread are transferred to the first portion of the shared log buffer. During the reserving and transferring of the first portion of the shared log buffer, one or more transaction threads of the multiple transaction threads are allowed to attach to a thread chain beginning with the leader thread as member threads. Upon completion of the transferring of the first portion of the shared log buffer, a second portion of the shared log buffer is reserved for storing the transaction records of the member threads in the thread chain for each of the multiple transaction threads. The transaction records of the member threads from each of the multiple transaction threads are transferred to the second portion of the shared log buffer. The transaction records in the shared log buffer are transferred to the transaction log. The method can be applied to a single-NUMA node, multi-NUMA node system or a NUMA incapable (or NUMA disabled) system. The method groups threads running on a data node and elects a leader thread one at a time from this thread group to perform logging without locking the thread. On a system that is NUMA incapable or NUMA disabled, the method works in the same manner as a single-NUMA node system.

In some or all examples of the first aspect, the method further comprises: terminating thread attachment to the thread chain upon completion of the transferring of the leader thread transaction records.

In some or all examples of the first aspect, the transferring of the transaction records of the member threads in the thread chain to the shared log buffer is performed by the leader thread.

In some or all examples of the first aspect, the method further comprises: traversing the thread chain; and determining a total log record size of transaction records of transaction threads in the thread chain.

In some or all examples of the first aspect, the reserving the first portion of the shared log buffer comprises: sending a first request to a request queue of the shared log buffer; and reserving the second portion of the shared log buffer includes sending a second request to the request queue of the shared log buffer.

In some or all examples of the first aspect, the method further comprises: receiving the first request and the second request by a request queue of the shared log buffer in a temporal order.

In some or all examples of the first aspect, the first and second portions of the shared log buffer are reserved in a temporal order or priority ranking.

In some or all examples of the first aspect, the electing comprises: accessing, by one or more transaction threads of the multiple transaction threads, a new leader thread indicator.

In some or all examples of the first aspect, the allowing comprises: attaching the member thread to the thread chain by appending a thread identifier of the member thread to an array or linked list tracking the member threads.

In some or all examples of the first aspect, the method further comprises: tracking member threads with any one of an array and a linked list.

In some or all examples of the first aspect, the method further comprises: maintaining a list of thread identifiers of the member threads in the thread chain.

In some or all examples of the first aspect, the data nodes are Non-Uniform Memory Access (NUMA) nodes.

In accordance with a second aspect of the present disclosure, there is provided a computing system for storing transaction records in a shared transaction log which is shared among multiple transaction threads describing changes occurring in a database in a manner that reduces contention among the multiple transaction threads for the shared transaction log. The computing system comprises a request processing module configured to receive user requests and initiate the multiple transaction threads to process the user requests, and a logging module. The logon module is configured to: elect a leader thread from the multiple transaction threads; reserve a first portion of a shared log buffer for storing transaction records of the leader thread of each of the multiple transaction threads; transfer the transaction records of the leader thread of the multiple transaction threads to the first portion of the shared log buffer; during the reserving and transferring of the first portion of the shared log buffer, allow one or more transaction threads of the multiple transaction threads to attach to a thread chain beginning with the leader thread as member threads; upon completion of the transfer of the first portion of the shared log buffer, reserve a second portion of the shared log buffer for storing transaction records of the member threads in the thread chain for each of the multiple transaction threads; transfer the transaction records of the member threads from each of the multiple transaction threads to the second portion of the shared log buffer; and transfer transaction records in the shared log buffer to the shared transaction log.

In some or all examples of the second aspect, the logging module is further configured to: terminate thread attachment to the thread chain upon completion of the transferring of the leader thread transaction records.

In some or all examples of the second aspect, the logging module is further configured to: transfer, by the leader thread, the transaction records of the member threads in the thread chain to the shared log buffer.

In some or all examples of the second aspect, the logging module is further configured to: traverse the thread chain; and determine a total log record size of transaction records of transaction threads in the thread chain.

In some or all examples of the second aspect, the logging module is configured to reserve the first portion of the shared log buffer by: sending a first request to a request queue of the shared log buffer; and reserving the second portion of the shared log buffer includes sending a second request to the request queue of the shared log buffer.

In some or all examples of the second aspect, the logging module is further configured to: receive the first request and the second request by a request queue of the shared log buffer in a temporal order.

In some or all examples of the second aspect, the first and second portions of the shared log buffer are reserved in a temporal order or priority ranking.

In some or all examples of the second aspect, the logging module is configured to electing the leader thread by: accessing, by one or more transaction threads of the multiple transaction, a new leader thread indicator.

In some or all examples of the second aspect, the logging module is configured to allow the one or more transaction threads of the multiple transaction threads to attach to the thread chain by: attaching the member thread to the thread chain by appending a thread identifier of the member thread to an array or linked list tracking the member threads.

In some or all examples of the second aspect, the logging module is further configured to: track member threads with any one of an array and a linked list.

In some or all examples of the second aspect, the logging module is further configured to: maintain a list of thread identifiers of the member threads in the thread chain.

In some or all examples of the second aspect, the data nodes are Non-Uniform Memory Access (NUMA) nodes.

In accordance with a further aspect of the present disclosure, there is provided a computing device comprising a processor, a memory and a communication subsystem. The memory having tangibly stored thereon executable instructions for execution by the processor. The executable instructions, in response to execution by the processor, cause the computing device to perform the methods described above and herein.

In accordance with a further aspect of the present disclosure, there is provided a non-transitory machine-readable medium having tangibly stored thereon executable instructions for execution by a processor of a computing device. The executable instructions, in response to execution by the processor, cause the computing device to perform the methods described above and herein.

Other aspects and features of the present disclosure will become apparent to those of ordinary skill in the art upon review of the following description of specific implementations of the application in conjunction with the accompanying figures.

DETAILED DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

The present disclosure teaches methods and systems for managing a database using a lockless logging system where transaction records are recorded in a shared transaction log that is shared among multiple transaction threads describing changes occurring in the database in a manner that reduces contention among the multiple transaction threads for the transaction log.

Typically, transaction logging within the distributed database system may include the steps of:
1) Each transaction thread generates its own transaction log record;
2) All transaction threads copy their generated log records to a shared log buffer (also referred to as a redo log buffer); and
3) The shared log buffer dirty pages are updated to a shared transaction log that is implemented within the System Global Area (SGA) in system memory such as Random Access Memory (RAM), which is shared by all databases of the distributed database system.

Locking is a database management technique where one or more locks permits a corresponding number of threads to reserve buffer space in the shared log buffer so that the threads that were able to reserve buffer space may modify and update the shared log buffer. Various open source RDBMS's such as MySQL and PostgreSQL use locking to control access to the shared log buffer.

While locking addresses thread synchronization, it can also cause lock contention where one transaction thread attempts to acquire a lock held by another thread, which degrades system performance, especially as the database transaction concurrency (i.e. the simultaneous execution of two or more threads) increases.

Logging systems in other RDBMS's may apply a lockless synchronization design. In lock-free logging systems, each transaction thread reserves an amount of memory space needed to copy its log without restrictions on the number of threads that may attempt to reserve buffer space. Such designs have demonstrated improvements over designs utilizing log buffer locking in a low-core multi-Non-Uniform Memory Access (NUMA) node system. The performance gain derives from removal of the log buffer access locks and thereby encouraging transaction processing concurrency.

With access locks on the shared log buffer, lock-based RDBMS's such as PostgreSQL and MySQL may alleviate contentions of the shared log buffer space reservation by restricting the number of logging threads concurrently accessing the shared log buffer. Whereas the lockless shared log buffer access design imposes no restriction on the shared log buffer access. This leads to higher contention on reserving shared log buffer space, and when the negative impact of this contention exceeds the performance benefit brought by the improving concurrency in this lockless solution, performance degradation may be observed.

In this disclosure, a DBMS can refer to a database instance, which is a set of software implemented memory structures that are used to manipulate data in a database. A database can refer to a set of files that store data and metadata. In some examples, database files may be stored within a persistent read/write storage such as a disc storage. A DBMS (e.g., database instance) may be implemented by a combination of a processing system and machine readable instructions executable on the processing system. In some examples, the DBMS may be hosted by a single computing system such as a computer. In some other examples, a DBMS may be hosted by a plurality of computing systems. In some further examples, multiple DBMS's may be hosted on a single computing system. A database transaction refers to a logical, atomic unit of work that is independently executed for data retrieval or updates, and can include one or more actions (also known as operations) that implement one or more changes to a database. In this regard, a database transaction includes an indivisible and irreducible series of actions that must all be completed. This means that in order for participating sites to complete and save a transaction (also referred to as "commit") all of the actions in the transaction must be completed. Otherwise, the transaction must be aborted and all of the actions rolled back. Examples of actions that can be performed by a site include actions that enable a site to store, modify, delete and retrieve data.

In accordance with one aspect of the present disclosure, there is provided a database management system (DBMS) with a lockless transaction log synchronization in which transaction threads generate respective thread transaction logs. A leader thread is elected from concurrent transaction threads. The leader thread may be randomly chosen amongst the one or more concurrent transaction threads, or the leader thread may be elected on the basis of the first thread to access a particular indicator, or any other suitable method. The leader thread sends a request to a shared log buffer to reserve a portion of the shared log buffer for copying its own thread transaction log. When the reservation request is processed, the leader thread copies its thread transaction log onto the reserved portion of the shared log buffer. While the leader is processing its thread transaction log, the leader thread permits other transaction thread to attach to itself thereby forming a thread chain. Thread attachment may be performed by any suitable method, including tracking member threads by their identifiers in an array or a linked list. Once the leader has completed copying its thread transaction log onto the shared log buffer, it ends any further thread attachments, such as by setting a new leader thread start indicator or any other suitable method. The leader thread then determines a portion of the shared log buffer required to accommodate all the thread transaction logs of the transaction threads in its thread chain and sends a request to reserve the required bu+ffer space. In some embodiments, the portion may correspond to the total log record size of all thread transaction logs. Upon processing the second buffer reservation, all thread transaction logs of the thread chain attached to the leader thread are copied onto the shared log buffer by the leader thread. The contents of the shared log buffer may then be transferred onto the shared transaction log in a disc or any suitable non-transitory permanent data storage unit(s).

In accordance with a further aspect, the present disclosure provides a database system having a plurality of processing units (such as CPU cores) which are partitioned into a plurality of Non-Uniform Memory Access (NUMA) nodes. Each NUMA node may include one or more of the processing units. Each processing unit is capable of executing one transaction thread, which generates thread transaction logs that need to be recorded into a log disc. There is provided a method and system for managing a NUMA node-based database using a lockless synchronization logging system where transaction records are recorded in a shared transaction log that is shared among multiple transaction threads describing changes occurring in the database in a manner that reduces contention among the multiple transaction threads from all NUMA nodes for the transaction log. Specifically, a leader thread may be elected from concurrent transaction threads in each NUMA node similar to methods described above. The leader thread from each NUMA node sends a request to reserve a portion of the shared log buffer for copying its own thread transaction log. When the reservation request is processed, the leader thread of each NUMA node copies its thread transaction log onto the reserved portion of the shared log buffer. While each of the leader threads is processing their respective thread transaction logs, each leader thread permits other transaction threads from the same NUMA nodes to attach to themselves to form a thread chain by methods as described above. Once a leader thread has completed copying its own thread transaction log onto the shared log buffer, it terminates any further thread attachments as described above. Each of the leader threads then determines a portion of the shared log buffer required to accommodate all of their respective follower thread transaction logs of their respective thread chains and sends a request to the shared log buffer request queue to reserve the required buffer space. In some embodiments, the portion may correspond to the total log record size of all thread transaction logs. The request queue receives leader thread requests from all NUMA nodes in sequential order and the shared log buffer processes the requests in accordance with the request queue ordering. Thus, the first and second requests (i.e. for the leader thread's own log and for the thread chain member logs) from a single leader thread may not be adjacent to one another and may be interjected by requests from leader threads of other NUMA nodes. Due to request reservation, no requested portions of the shared log buffer may overlap. All thread transaction logs of the respective thread chains attached to their respective leader threads are copied onto the shared log buffer.

Computer System Hardware

Figure 1:
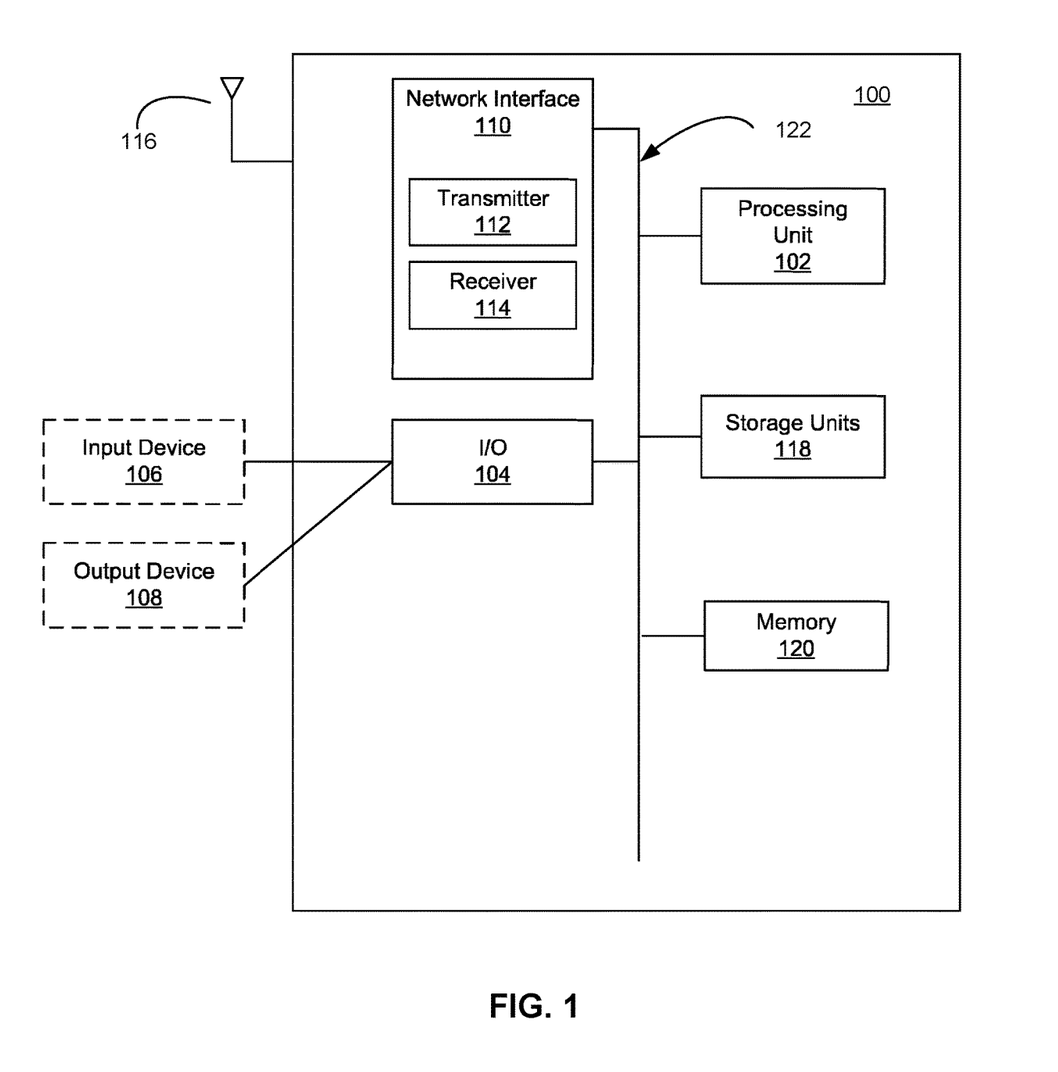
FIG. 1 illustrates an example schematic diagram of a processing unit that may be used to implement embodiments of the present disclosure.

FIG. 1 illustrates a block diagram of an example simplified computing system 100, which may be used to implement methods and systems described herein. Other processing systems suitable for implementing the methods and systems described in the present disclosure may be used, which may include components different from those discussed below. In some example embodiments, the computing system 100 may be implemented across more than one physical hardware unit, such as in a parallel computing, distributed computing, virtual server, or cloud computing configuration. Although FIG. 1 shows a single instance of each component, there may be multiple instances of each component in the computing system 100.

The computing system 100 may include one or more processing unit(s) 102, such as a central processing unit (CPU) with a hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The computing system 100 may also include one or more input/output (I/O) interfaces 104, which may enable interfacing with one or more appropriate input devices 106 and/or output devices 108. In the example shown, the input device(s) 106 (e.g., a keyboard, a mouse, a microphone, a touchscreen, and/or a keypad) and output device(s) 108 (e.g., a display, a speaker and/or a printer) are shown as optional and external to the computing system 100. In other examples, one or more of the input device(s) 106 and/or the output device(s) 108 may be included as a component of the computing system 100. In other examples, there may not be any input device(s) 106 and output device(s) 108, in which case the I/O interface(s) 104 may not be needed.

The computing system 100 may include one or more network interfaces 110 for wired or wireless communication with a network. In example embodiments, network interfaces 110 include one or more wireless interfaces such as transmitters 112 that enable communications in a network. The network interface(s) 110 may include interfaces for wired links (e.g., Ethernet cable) and/or wireless links (e.g., one or more radio frequency links) for intra-network and/or inter-network communications. The network interface(s) 110 may provide wireless communication via one or more transmitters 112 or transmitting antennas, one or more receivers 114 or receiving antennas, and various signal processing hardware and software. In this regard, some network interface(s) 110 may include respective processing systems that are similar to computing system 100. In this example, a single antenna 116 is shown, which may serve as both transmitting and receiving antenna. However, in other examples there may be separate antennas for transmitting and receiving.

The computing system 100 may also include one or more storage devices such as storage units 118, which may include a non-transitory storage unit such as a solid state drive, a hard disk drive, a magnetic disk drive and/or an optical disk drive. The storage devices of computing system 100 may include one or more memories 120, which may include a volatile or non-volatile memory (e.g., a flash memory, a random access memory (RAM), and/or a read-only memory (ROM)). The storage devices (e.g., storage units 118 and/or non-transitory memory(ies) 120) may store instructions for execution by the processing unit(s) 102, such as to carry out the present disclosure. The memory(ies) 120 may include other software instructions, such as for implementing an operating system or a DBMS disclosed herein and other applications/functions.

In some examples, one or more data sets and/or module(s) may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 122 providing communication among components of the computing system 100, including the processing unit(s) 102, I/O interface(s) 104, network interface(s) 110, storage unit(s) 118, memory(ies) 120. The bus 122 may be any suitable bus architecture including, for example, a memory bus, a peripheral bus or a video bus.

In some embodiments, a DBMS in accordance with the present disclosure may be implemented using computing system 100 having a plurality of processing units 102. In such embodiments, the DBMS may adopt a NUMA architecture designed for multiprocessing, where memory access time may be dependent on the memory location relative to the processing units. Under NUMA, by partitioning a plurality of processing units 102 into multiple NUMA nodes and specifying portions of storage devices local to each node, each processing unit 102 may access its respective local storage devices within the same NUMA node more quickly (i.e. shorter latency) than remote storage devices of another NUMA node. Each NUMA node may also include its own memory controller that typically serves up to 8 processing units 102.

Database Management System

Between the physical database (i.e., data stored on a permanent storage unit) and the users of the system, a DBMS is typically provided. In general, all user requests for accessing the database are received and processed by the DBMS. For example, a user request may include accessing, updating, adding, and/or deleting information from data files. In this manner, the DBMS provides an interface and the necessary tools for the user to interact with the physical database. At the same time, the DBMS provides functionalities required to maintain data integrity of the data files and safeguard against potential failures.

Figure 2:
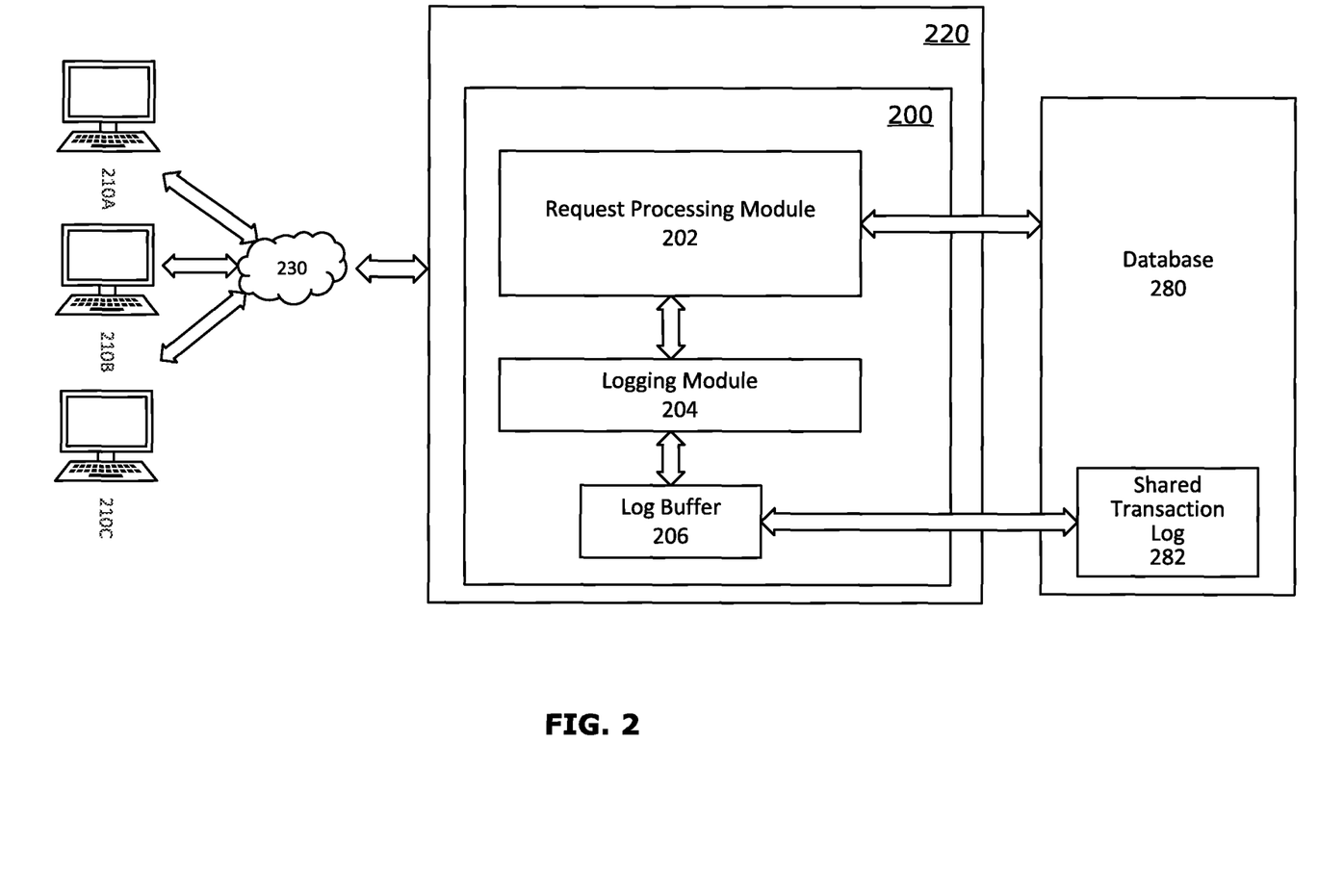
FIG. 2 illustrates a block diagram of a simplified database management system (DBMS) in accordance with exemplary embodiments of the present disclosure.

FIG. 2 illustrates a block diagram of a simplified DBMS 200 in accordance with exemplary embodiments of the present disclosure. The DBMS 200 can be a module that is implemented by a combination of machine-readable instructions executable on a processing system. As used here, a "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit.

Storage devices (i.e. storage units 118 and/or memory 120) store machine readable software instructions that are executable by one or more process units 102 for implementing a DBMS 200 that allows users or clients to define, create, maintain and control access to a database 280. Database 280, containing one or more data files and/or metadata files, may be implemented as a module within storage unit(s) 118.

The DBMS 200 and database 280 may be implemented within a single (or standalone) computing system 100, or alternatively, system 200 and database 280 may also be embodied across multiple computing systems 100 interconnected over a network. In some embodiments, the DBMS 200 employs the lockless logging synchronization system that utilizes a leader-follower thread configuration where transaction threads are grouped (or batched) together for buffer space reservation and transfer to reduce buffer reservation contention as described in further detail below.

As shown in FIG. 2, one or more users 210A, 210B, and 210C (collectively referred to as users 210) are connected to a server machine 220 via a communication network 230. The users 210 may be any electronic device that is used by a user to access database 280. For example, user 210 may be a personal laptop computer or a desktop computer, such as a computing system 100, or other mobile computing device such as for example a tablet, and a Personal Digital Assistant (PDA). The communication network 230 may include one or more networks including, for example, the Intranet, one or more intranets, wired networks, wireless networks, virtual private networks, and combinations thereof. Typically, users 210 issue requests (also referred to as commands) in a suitable database query language (i.e. SQL queries) to the server machine 220. The requests or commands may specify the nature of database access, such as retrieve information, update information, or delete information etc.

The server machine 220 may include one computing system 100 or multiple computing systems 100 connected over a communications network. The server machine 220 may execute software instructions in implementing a DBMS 200 in accordance with the present disclosure. The DBMS 200 includes a request processing module 202, and a logging module 204. It should be understood that the request processing module 202 and the logging module 204 are not necessarily separate units of the system 200, and that the illustration of the request processing module 202 and logging module 204 as separate blocks within the system 200 may only be a conceptual representation of the overall operation of the system 200.

The request processing module 202 includes one or more submodules for receiving, processing, and executing user queries. In some embodiments, the query processing module may include a listener (not shown) configured to listen for (i.e. actively monitor) incoming user requests. Upon receiving a user request, the listener processes the request to identify protocol and the database server the requested is intended for, and establishes a connection with the server machine 220 so that the user 210 and the server machine 220 may communicate directly. For embodiments that utilize dedicated server threads, the listener initiates a separate dedicated thread for each incoming user request dedicated to servicing the particular user. Once the user is connected to the dispatcher or dedicated server thread, the listener resumes listening for incoming user requests. The request processing module 202 may further include one or more additional modules including parser, normalizer, compiler, integrity checker, query optimizer, scheduler, and execution module among others, to process and execute user request as are well known in the art.

During operation of the request processing module 202, as transactions initiated by each user request are processed, the logging module 204 is configured to record changes made to the database 280 as result of the user requests. Entries of transaction logs are representative of the changes that took place within the database 280, and may be used, for example, during data recovery in the event of database failure or data corruption. The logging module 204 records transaction records in a log buffer 206 in a portion of the memory 120 allocated as System Global Area (SGA). The SGA is a shared memory structure that contains control information and data for a database instance and is accessible by all server threads as well as background threads. When a transaction is committed to, or executed on, database 280, the buffered transaction records are written to a shared transaction log file 282 typically stored in persistent storage units 118 by the database background process Log Writer (LGWR). In some embodiments, the logging module 204 may be a lockless logging module that does not employ the locking methodology on log buffer 206.

Figure 3:
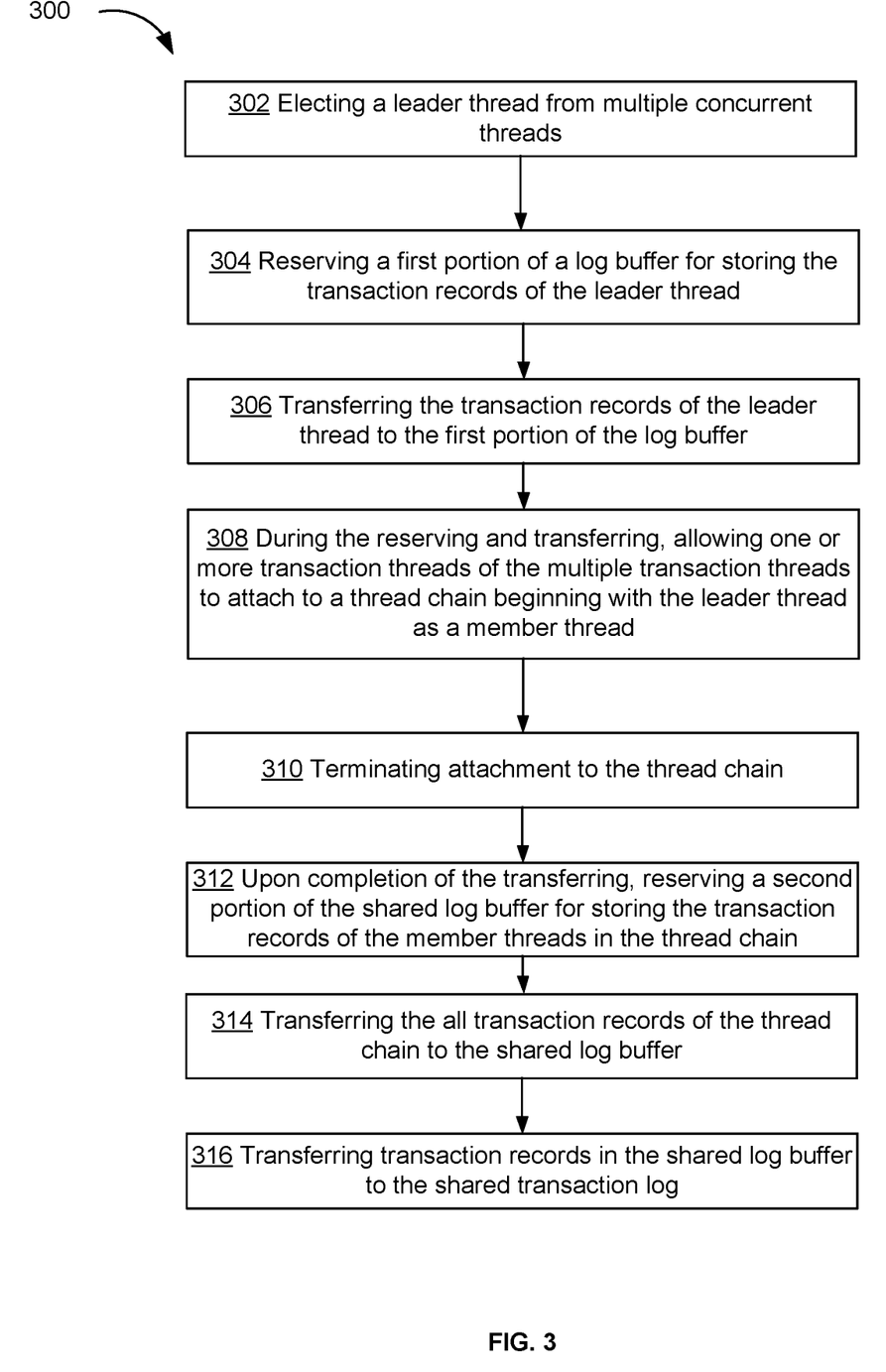
FIG. 3 illustrates a flowchart of an exemplary method for recording transaction records within a lockless multi-thread database environment performed by a logging module of the DBMS in FIG. 2.

FIG. 3 is a flowchart of a method 300 performed by a logging module 204 of a DBMS 200 for recording transactions records within a lockless multi-thread database environment according to an example embodiment of the present disclosure. In this environment, a plurality of database server threads are servicing a corresponding number of user requests that are attempting to access and possibly make changes to the database 280. Each instances mounts one thread of transaction logs upon being initiated.

At 302, when a user request is committed to the database 280 resulting in a change in the database, the corresponding database transaction thread that is responsible for committing the request has its own transaction thread for generating one or more transaction records representative of the change made to the database 280. Each transaction thread may be identified with a unique identifier of the transaction thread. Once a transaction record has been generated, a leader thread may be elected from one or more concurrent transaction threads. By way of a non-limiting example, the leader thread election may be implemented by randomly selecting one thread as the leader thread. By way of a further non-limiting example, the leader thread may be elected as the first thread to access a particular new leader thread indicator value. The indicator may be initialized with a unique value, such as a null, out of range value, or any other appropriate value. Once the indicator has been accessed, its initial value may be altered such that subsequent threads accessing the indicator would not be a leader thread.

At 304, once the leader thread has been elected, the leader thread places a buffer request to the log buffer 206 of the SGA. Since the SGA is accessible to all threads, the log buffer 206 may also be referred to a shared log buffer 206. The request, along with requests from one or more other leader threads as discussed in more detail below, are placed in a request queue of the log buffer 206. The request may include the amount of buffer space required to transfer the transaction records as indicated by the log record size information stored by the transaction thread. In some embodiments, the requests are placed in the request queue in the order that they are received. Upon receiving the requests, the log buffer 206 reserves corresponding buffer space for the requests. In some embodiments, the log buffer 206 is filled in a circular fashion where once the buffer is full, the buffer begins writing from the beginning of the buffer again. Thus, in some embodiments, the buffer space is reserved such that no overriding is permitted. In other words, the same portion of buffer space would not be reserved for more than one request. If there is insufficient buffer space to accommodate the next request, the buffer space reservation may be temporarily suspended until buffer space becomes available by copying portions of the log buffer to the shared transaction log 282 stored on the storage units 118.

Alternatively, when the transaction thread was not elected as the leader thread, the transaction thread links itself to the thread chain initiated by the leader thread.

At 306, after having reserved log buffer space, the leader thread transfers, such as by copying, its transaction records onto the log buffer 206 in the buffer space reserved for the leader thread using the pointer to the log records. In some embodiments, an atomic operation, such as compare and swap, is used to prevent errors caused by a change in the anchor value during the time between the transaction thread obtaining the anchor value and inserting its identifier.

At 308, while the leader thread is transferring its transaction records onto the log buffer 206, the leader thread allows one or more transaction threads to link to it. Thread attachment may be performed by any suitable method. By way of a non-limiting example, arrays or a linked list may be used to track member threads of the thread chain such that any new thread may attach to the end of the thread. In some embodiments, the leader thread election indicator may be used to track the last member thread of the thread chain.

At 310, once the leader thread has completed transferring its log records onto the reserved buffer space, the leader transaction thread terminates any further linking to its thread chain such as by setting a new leader thread indicator or any other suitable method. In some embodiments, the leader thread is capable of traversing the entire thread chain, such as iterating through the member threads whose identifiers are stored in a tracking array or linked list, to determine a total buffer space required to accommodate the transaction records for all members of its thread chain. It is understood that any other method of determining the total member thread transaction record size may be used. Since the transaction log of the leader thread has been transferred, the initial request from the leader thread in the request queue is removed.

At 312, having determined the total buffer space required to accommodate the transaction records of all member threads, the leader thread places another request to the log buffer request queue reserving the required buffer space.

At 314, when the request for member thread transaction record buffer space is processed, the leader thread is responsible for transferring the transaction records for all member threads onto the log buffer 206. Thereby the leader thread and any linked member thread are able to transfer their transaction records onto the log buffer without locking the log buffer for any individual thread.

At 316, the transaction records in the log buffer are transferred to transaction log files stored on the database 280 by using the LGWR process.

Figure 4:
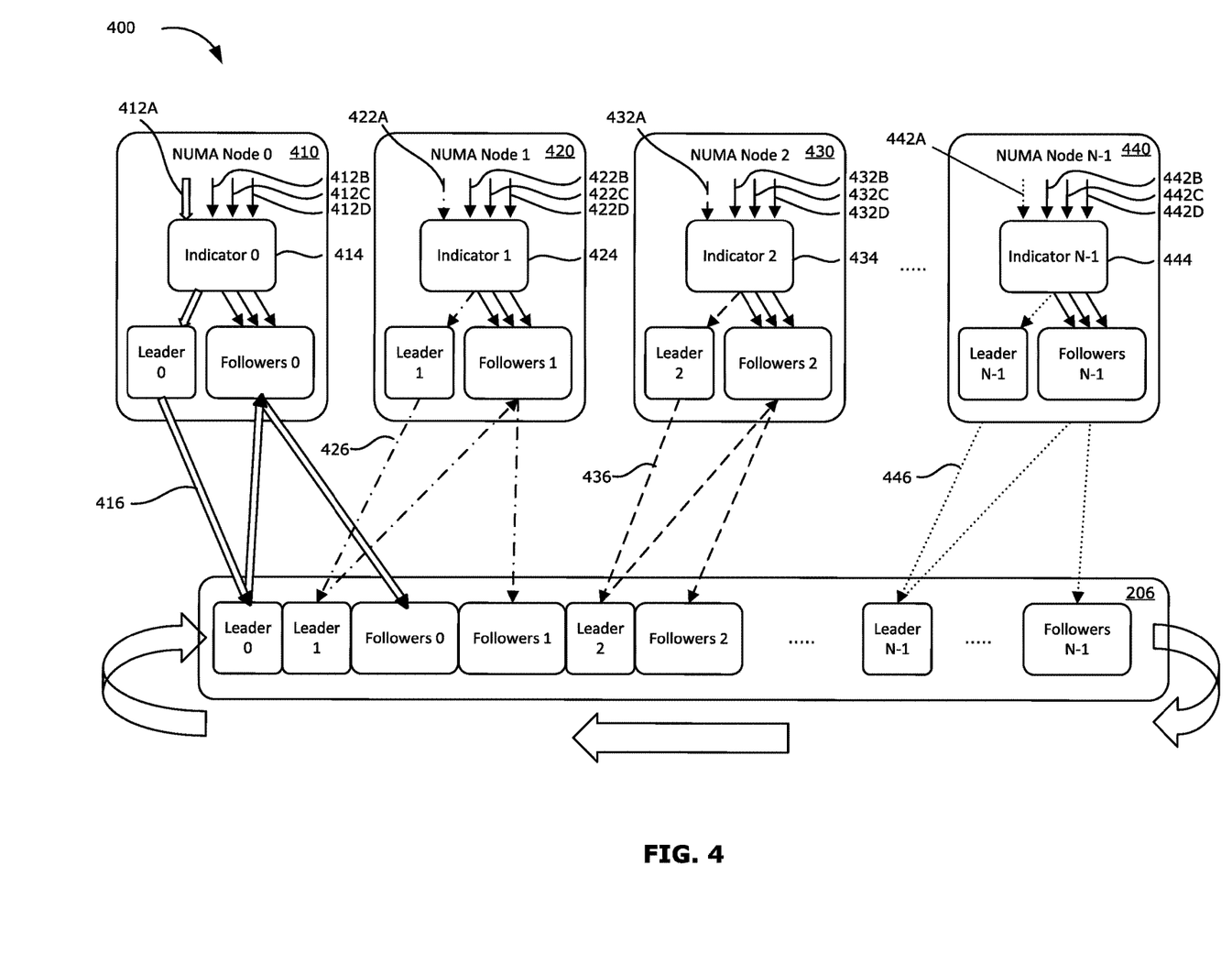
FIG. 4 illustrates a partial block diagram of a DBMS having a plurality of NUMA nodes in accordance with another exemplary embodiment of the present disclosure.

In some embodiments, the DBMS 200 includes multiple computing systems 100 having a plurality of processing units 102. The processing units 102 may be organized into multiple NUMA nodes. In some embodiments, each NUMA node comprises an anchor field that is accessible to the transaction threads of the respective NUMA node. FIG. 4 shows a partial block diagram of a simplified DBMS 400 in accordance with exemplary embodiments of the present disclosure.

As shown, DBMS 400 includes a plurality of computing systems 100 having a plurality of processing units 102 (such as CPU cores) that are partitioned into a plurality of Non-Uniform Memory Access (NUMA) nodes 410, 420, 430, and 440. Each NUMA node may include one or more of the processing units. In some embodiments, the computing systems 100 of DBMS 400 may each include multiple CPU sockets where multiple processing units 102 are coupled to each socket. In some embodiments, the processing units 102 are partitioned into NUMA nodes in accordance with the CPU sockets to which they are connected. By way of a non-limiting example, a 16-processing unit (i.e. CPU core) computing system 100 with two sockets may be configured to have two NUMA nodes with eight processing units in each node. Each processing unit may generate a plurality of transaction threads. For example, transaction threads 412A-D, collectively referred to as transaction threads 412 for NUMA node 410, threads 422A-D, collectively referred to as transaction threads 422, for NUMA node 420, threads 432A-D, collectively referred to as transaction threads 432, for NUMA node 430, and threads 442A-D, collectively referred to as transaction threads 442, for NUMA node 440. Each of which generates transaction records that are representative of changes made within database 280 that need to be transferred to log buffer 206. In the illustrated embodiment, log buffer 206 may be filled in a circular fashion as indicated by the arrows.

Figure 5:
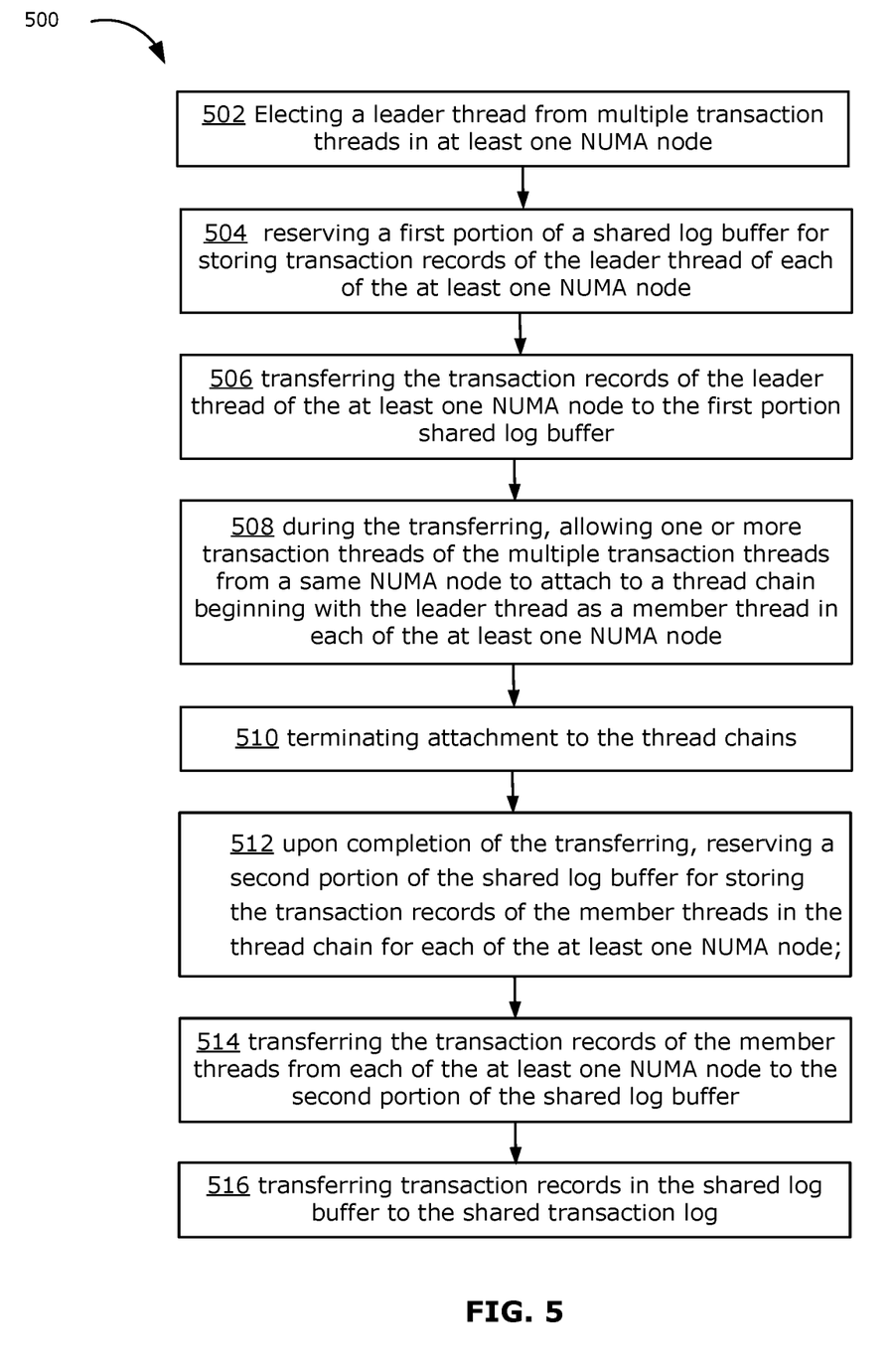
FIG. 5 illustrates a flowchart of another exemplary method for recording transaction records performed by the DBMS in FIG. 4.

FIG. 5 is a flowchart of a method 500 performed by DBMS 400 for managing a database having a plurality of NUMA nodes using a lockless synchronization logging module where transaction records are recorded in a shared transaction log shared among multiple transaction threads in a manner that reduces contention among the multiple transaction threads from all NUMA nodes for the transaction log.

As shown in FIG. 4, each NUMA node 410, 420, 430, 440 includes its own respective anchor fields 414, 424, 434, and 444. At 502, a leader thread is elected from one or more concurrent transaction threads in each NUMA node. By way of an example, the leader thread may be randomly chosen amongst the one or more concurrent threads. Alternatively, as shown in FIG. 4, each of the concurrent threads may access their respective election indicators for leader thread election once their respective transaction records are ready to be transferred the transaction log file. The first thread to do so in each NUMA node may be elected as the leader thread. For example, in FIG. 4, the first transaction thread 412 to access indicator 414 may be elected as the leader thread of NUMA node 410, the first transaction thread 422 to access indicator 424 may elected as leader thread of NUMA node 420, the first transaction thread 432 to access indicator 434 may be elected as leader thread of NUMA node 430, and the first transaction thread 442 to access indicator 444 may be elected as the leader thread of NUMA node 440. As described above, indicator 414, 424, 434, and 444 may be a register or any other suitable software construct. The first transaction thread in each NUMA node to access its respective leader election indicators to elect a leader thread within each of the NUMA nodes 410, 420, 430, and 440.

At 504, the leader thread from each NUMA node (i.e. 412A, 422A, 432A, 442A) sends a first request to a request queue of shared log buffer 206 to reserve a portion of the shared log buffer 206 for copying its own transaction records. As shown in FIG. 4, the requests for the leaders may arrive at different times depending on the timing of their respective transaction record generation. In some embodiments, the first requests 416, 426, 436, and 446 may be received by the request queue of the log buffer 206 in the order that they are received and may not necessarily be in the order illustrated in FIG. 4.

At 506, when the first requests 416, 426, 436, 446 are processed by the logging module 204 on the shared log buffer 206, the leader thread of each NUMA node proceeds to transfer (i.e. by copying) its transaction records onto the reserved portion of the shared log buffer 206.

At 508, while each of the leader threads is transferring over their respective log records, each leader thread permits other transaction threads from the same NUMA node to attach to themselves to form a thread chain. Thread attachment may be performed by any suitable method including tracking member threads by their transaction identifiers in an array or a linked list. In some embodiments, the indicator used for leader election may be used to track the last member of the thread chain. It is understood that other methods of forming a thread chain may also be used.

At 510, once each leader thread has completed transferring its own transaction records onto the shared log buffer 206, their respective first requests 416, 426, 436, and 446 are removed from the request queue. The leader threads 412A, 422A, 432A, and 442A end any further thread attachments to its thread chain, such as by setting a new leader thread indicator or any other suitable method. Any subsequent transaction threads from the same NUMA node may initiate a new leader thread election for the next thread chain. In some embodiments, there may be multiple leader threads in a single NUMA node simultaneously. For example, a second leader thread may be elected while a first leader thread is transferring member thread log to the log buffer.

At 512, any leader thread that has terminated linking determines a total buffer space required to accommodate the transaction records of all follower threads. In some embodiments, the leader thread may traverse its own thread chain to determine a total buffer space required to accommodate the transaction records for all members of its thread chain. Alternatively, a table may be used to store the location of all member threads and the size of each of their transaction records, which may be directly accessed by the leader thread. It is understood that any other method of determining the total member thread transaction record size may be used. The leader threads then each send a second request to the shared log buffer request queue to reserve the required portion. In some embodiments, the reserved portion of the log buffer 206 by the second request may correspond to the total log record size of all thread transaction logs.

The request queue receives the requests (first or second requests from all NUMA nodes) in sequential order and the shared log buffer 206 may process the requests in accordance to the request queue ordering. Alternatively, the log buffer 206 may process the requests based on other criterion, such as priority level, file size, or any other suitable order. In some embodiments, requests from a single leader thread (i.e. the first and second requests) may not be adjacent to one another within the request queue and may be interjected by requests from leader threads of other NUMA nodes. Due to request reservation, no requested portions of the shared log buffer may overlap. As shown in FIG. 4, inside buffer 206, the buffer space reserved for log records of NUMA node 410 do not contiguously follow the buffer space reserved for log records of its leader thread 412A.

At 514, the requests from the leader threads of different NUMA nodes are processed in sequential order or any other suitable ordering of the requests, and all thread transaction logs of the respective thread chains attached to their respective leader threads are transferred onto the shared log buffer.

At 516, the buffered transaction records are transferred onto the transaction log files stored in the database 280.

The steps (also referred to as operations) in the flowcharts and drawings described herein are for purposes of example only. There may be many variations to these steps/operations without departing from the teachings of the present disclosure. For instance, the steps may be performed in a differing order, or steps may be added, deleted, or modified, as appropriate.

General

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for storing transaction records that describe changes occurring in a database to a shared transaction log shared by multiple transaction threads in a manner that reduces contention among the multiple transaction threads for the shared transaction log, wherein the multiple transaction threads are stored in one or more data nodes, the method comprising:
   electing a leader thread from the multiple transaction threads;
   reserving a first portion of a shared log buffer for storing transaction records of the leader thread of each of the multiple transaction threads;
   transferring the transaction records of the leader thread of the multiple transaction threads to the first portion of the shared log buffer;
   during the reserving and transferring of the first portion of the shared log buffer, allowing one or more transaction threads of the multiple transaction threads to attach to a thread chain beginning with the leader thread as member threads;
   upon completion of the transferring of the first portion of the shared log buffer, reserving a second portion of the shared log buffer for storing the transaction records of the member threads in the thread chain for each of the multiple transaction threads;
   transferring the transaction records of the member threads from each of the multiple transaction threads to the second portion of the shared log buffer; and
   transferring transaction records in the shared log buffer to the shared transaction log.

2. The method of claim 1, further comprising:
   terminating thread attachment to the thread chain upon completion of the transferring of the leader thread transaction records.

3. The method of claim 1, wherein the transferring of the transaction records of the member threads in the thread chain to the shared log buffer is performed by the leader thread.

4. The method of claim 1, further comprising:
   traversing the thread chain; and
   determining a total log record size of transaction records of transaction threads in the thread chain.

5. The method of claim 1, wherein the reserving the first portion of the shared log buffer comprises:
   sending a first request to a request queue of the shared log buffer; and
   reserving the second portion of the shared log buffer includes sending a second request to the request queue of the shared log buffer.

6. The method of claim 5, further comprising:
   receiving the first request and the second request by the request queue of the shared log buffer in a temporal order.

7. The method of claim 1, wherein the first and second portions of the shared log buffer are reserved in a temporal order or priority ranking.

8. The method of claim 1, wherein the electing comprises accessing, by one or more transaction threads of the multiple transaction threads, a new leader thread indicator.

9. The method of claim 1, wherein the allowing comprises:
attaching the member thread to the thread chain by appending a thread identifier of the member thread to an array or linked list tracking the member threads.

10. The method of claim 1, further comprising:
tracking member threads with any one of an array and a linked list.

11. The method of claim 1, further comprising:
maintaining a list of thread identifiers of the member threads in the thread chain.

12. The method of claim 1, wherein the data nodes are Non-Uniform Memory Access (NUMA) nodes.

13. A computing system for storing transaction records in a shared transaction log which is shared among multiple transaction threads describing changes occurring in a database in a manner that reduces contention among the multiple transaction threads for the shared transaction log, the multiple transaction threads being stored in one or more data nodes, the computing system comprising:
a memory storing instructions; and
at least one processor in communication with the memory, the at least one processor configured, upon execution of the instructions, to:
receive user requests and initiate the multiple transaction threads to process the user requests;
elect a leader thread from the multiple transaction threads;
reserve a first portion of a shared log buffer for storing transaction records of the leader thread of each of the multiple transaction threads;
transfer the transaction records of the leader thread of the multiple transaction threads to the first portion of the shared log buffer;
during the reserving and transferring of the first portion of the shared log buffer, allow one or more transaction threads of the multiple transaction threads to attach to a thread chain beginning with the leader thread as member threads;
upon completion of the transfer of the first portion of the shared log buffer, reserve a second portion of the shared log buffer for storing transaction records of the member threads in the thread chain for each of the multiple transaction threads;
transfer the transaction records of the member threads from each of the multiple transaction threads to the second portion of the shared log buffer; and
transfer transaction records in the shared log buffer to the shared transaction log.

14. The computing system of claim 13, wherein the processor further executing the instructions to:
terminate thread attachment to the thread chain upon completion of the transferring of the leader thread transaction records.

15. The computing system of claim 13, the processor further executing the instructions to:
transfer, by the leader thread, the transaction records of the member threads in the thread chain to the shared log buffer.

16. The computing system of claim 13, wherein the processor further executing the instructions to:
traverse the thread chain; and
determine a total log record size of transaction records of transaction threads in the thread chain.

17. The computing system of claim 13, wherein the processor further executing the instructions to reserve first portion of the shared log buffer by:
sending a first request to a request queue of the shared log buffer; and
reserving the second portion of the shared log buffer includes sending a second request to the request queue of the shared log buffer.

18. The computing system of claim 17, wherein the processor further executing the instructions to:
receive the first request and the second request by the request queue of the shared log buffer in a temporal order.

19. The computing system of claim 13, wherein the first and second portions of the shared log buffer are reserved in a temporal order or priority ranking.

20. The computing system of claim 13, wherein the processor further executing the instructions to elect the leader thread by:
accessing, by one or more transaction threads of the multiple transaction threads, a new leader thread indicator.

21. The computing system of claim 13, wherein the processor further executing the instructions to allow the one or more transaction threads of the multiple transaction threads to attach to the thread chain by:
attaching the member thread to the thread chain by appending a thread identifier of the member thread to an array or linked list tracking the member threads.

22. The computing system of claim 13, wherein the processor further executing the instructions to:
track member threads with any one of an array and a linked list.

23. The computing system of claim 13, the processor further executing the instructions to:
maintain a list of thread identifiers of the member threads in the thread chain.

24. The computing system of claim 13, wherein the data nodes are Non-Uniform Memory Access (NUMA) nodes.

* * * * *